US010480966B1

(12) United States Patent
Mahaffey et al.

(10) Patent No.: US 10,480,966 B1
(45) Date of Patent: Nov. 19, 2019

(54) ADAPTABLE FIXTURE MOUNT SENSOR FOR VAPOR TIGHT LIGHT FIXTURES

(71) Applicant: Universal Lighting Technologies, Inc., Madison, AL (US)

(72) Inventors: Rob Mahaffey, Burnaby (CA); John Cavacuiti, Burnaby (CA); Glen Tracey, Burnaby (CA); Wilson Tse, Burnaby (CA)

(73) Assignee: Universal Lighting Technologies, Inc., Madison, AL (US)

( * ) Notice: Subject to any disclaimer, the term of this patent is extended or adjusted under 35 U.S.C. 154(b) by 287 days.

(21) Appl. No.: 15/423,317

(22) Filed: Feb. 2, 2017

Related U.S. Application Data

(60) Provisional application No. 62/290,237, filed on Feb. 2, 2016.

(51) Int. Cl.
| | |
|---|---|
| *G01D 11/30* | (2006.01) |
| *F21V 23/00* | (2015.01) |
| *F21V 17/10* | (2006.01) |
| *G01D 11/24* | (2006.01) |

(52) U.S. Cl.
CPC ............ *G01D 11/30* (2013.01); *F21V 17/10* (2013.01); *F21V 23/008* (2013.01); *G01D 11/245* (2013.01)

(58) Field of Classification Search
CPC ..... G01D 11/30; G01D 11/245; F21V 23/008; F21V 17/10
USPC .......................................................... 73/431
See application file for complete search history.

(56) References Cited

U.S. PATENT DOCUMENTS

| | | | | |
|---|---|---|---|---|
| 2012/0169507 | A1* | 7/2012 | Dyer | F21V 23/0471 340/693.11 |
| 2013/0207552 | A1* | 8/2013 | Plunk | F21S 8/02 315/152 |
| 2013/0341510 | A1* | 12/2013 | Aurongzeb | H03K 17/941 250/338.1 |
| 2014/0061480 | A1* | 3/2014 | Huang | G01J 1/42 250/353 |

* cited by examiner

*Primary Examiner* — Marrit Eyassu
(74) *Attorney, Agent, or Firm* — Patterson Intellectual Property Law, P.C.; Gary L. Montle

(57) ABSTRACT

The present invention relates to an adaptable sensor assembly to be mounted to a light fixture in a fixture opening of the light fixture. A mount extends from the sensor housing. A break point is defined in the mount. First and second mount portions are located on either side of the break point. Each of the first and second mount portions are able to connect to the light fixture at the fixture opening. The first mount portion may connect to the light fixture if the light fixture has a large gasket lip, and the second portion may connect to the light fixture if the light fixture has a short gasket lip.

6 Claims, 8 Drawing Sheets

US 10,480,966 B1

ADAPTABLE FIXTURE MOUNT SENSOR FOR VAPOR TIGHT LIGHT FIXTURES

CROSS-REFERENCES TO RELATED APPLICATIONS

This application claims benefit of the following patent application(s) which is/are hereby incorporated by reference:

U.S. Provisional Patent Application No. 62/290,237, filed on Feb. 2, 2016, directed to an "Adaptable Fixture Mount Sensor for Vapor Tight Light Fixtures."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Stricter energy code requirements require that luminaires include control capability such as utility driven Demand Response, daylight harvesting, occupancy sensing, bi-level dimming and/or on/off control.

Addition of such control capability can be achieved by adding a device to a knock-out, or hole, in a light fixture.

Unless the control device is specifically designed for the particular fixture to which it will be connected, it is possible that the mechanical design of the fixture will obscure the sensing capability of the control device.

What is needed, therefore, is a solution that allows a control device to have interoperability with a variety of fixtures.

BRIEF SUMMARY OF THE INVENTION

The present invention relates to an adaptable sensor assembly to be mounted to a light fixture in a fixture opening of the light fixture. A mount extends from the sensor housing. A break point is defined in the mount. First and second mount portions are located on either side of the break point. Each of the first and second mount portions are able to connect to the light fixture at the fixture opening. The first mount portion may connect to the light fixture if the light fixture has a large gasket lip, and the second portion may connect to the light fixture if the light fixture has a short gasket lip.

The present invention also relates to a method of mounting a sensor assembly on a corresponding light fixture. If the light fixture has a gasket lip that would not extend into a sensing area of the sensor when no spacer is present between the fixture and the assembly, a user may break the first mount portion away from the second mount portion at a break point. A user may then removably connect the sensor assembly to the light fixture by inserting the second mount portion into a fixture opening of the light fixture. If the light fixture has a gasket lip that would extend into the sensing area of the sensor when no spacer is present between the fixture and the assembly, a user may place the spacer onto the sensor assembly and then removably connect the sensor assembly to the light fixture by inserting the first mount portion into the fixture opening.

DETAILED DESCRIPTION OF THE INVENTION

Reference will now be made in detail to embodiments of the present invention, one or more drawings of which are set forth herein. Each drawing is provided by way of explanation of the present invention and is not a limitation. In fact, it will be apparent to those skilled in the art that various modifications and variations can be made to the teachings of the present disclosure without departing from the scope of the invention. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Figure 1:
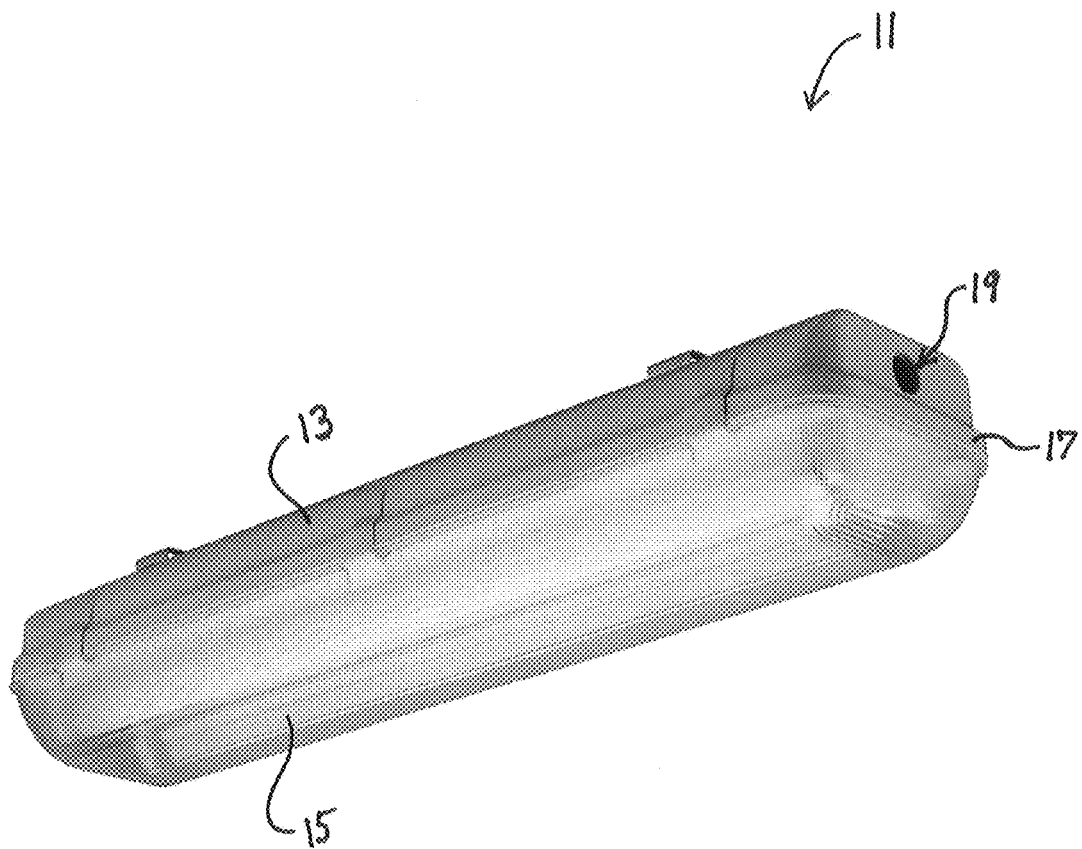
FIG. 1 is a perspective view of a typical light fixture.
Figure 2:
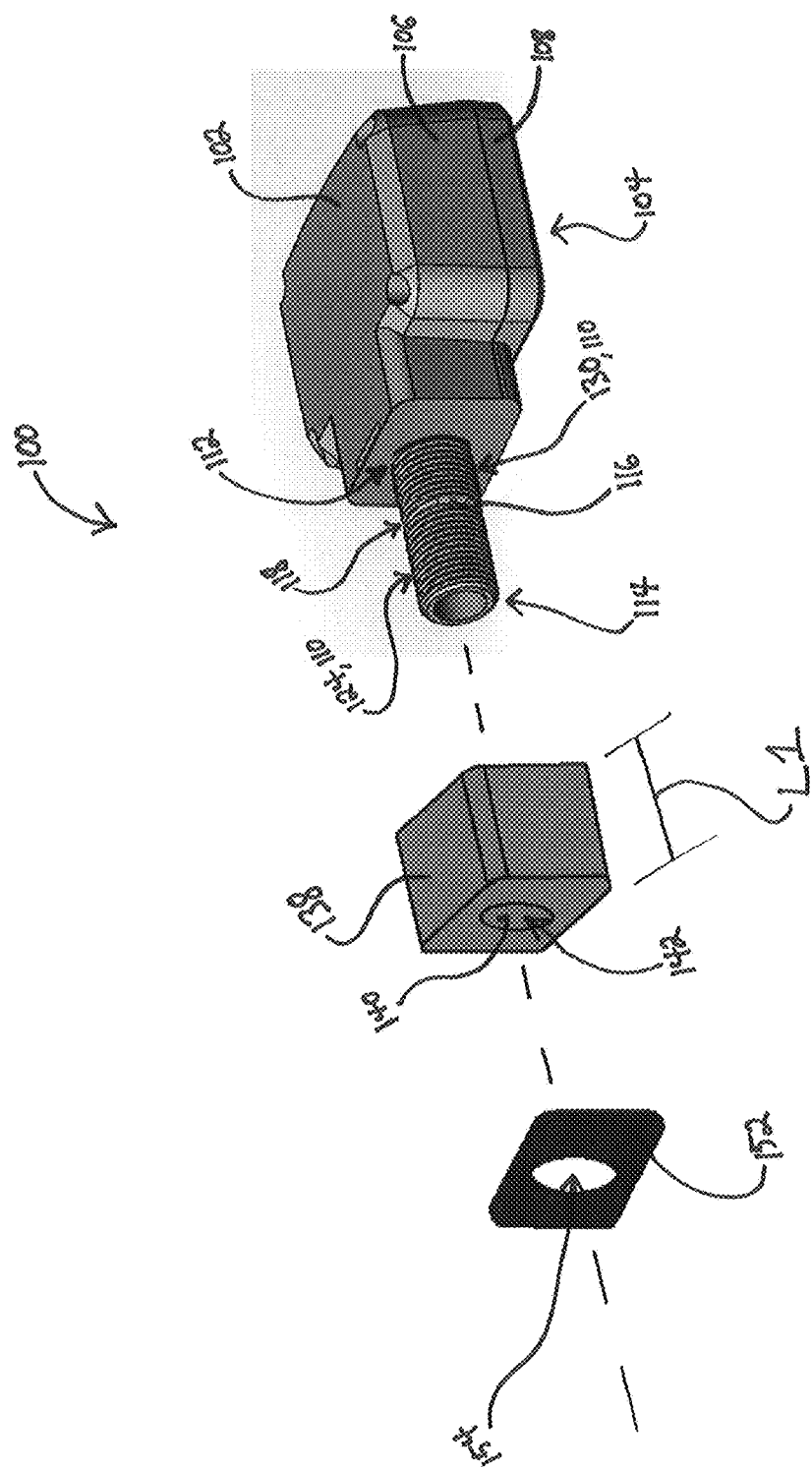
FIG. 2 is an exploded perspective view of an embodiment of the adaptable sensor assembly having a spacer and gasket exploded therefrom.
Figure 3:
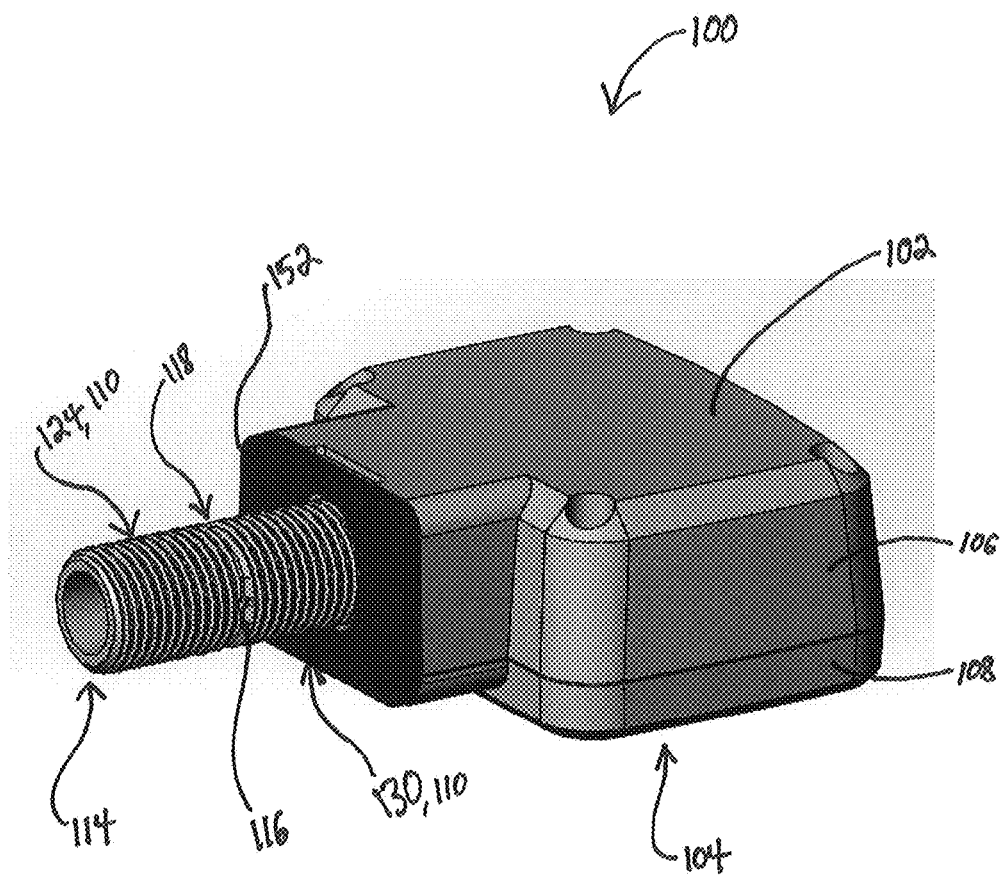
FIG. 3 is a perspective view of the adaptable sensor assembly of FIG. 2 without the spacer and with the gasket positioned against the sensor housing.
Figure 4:
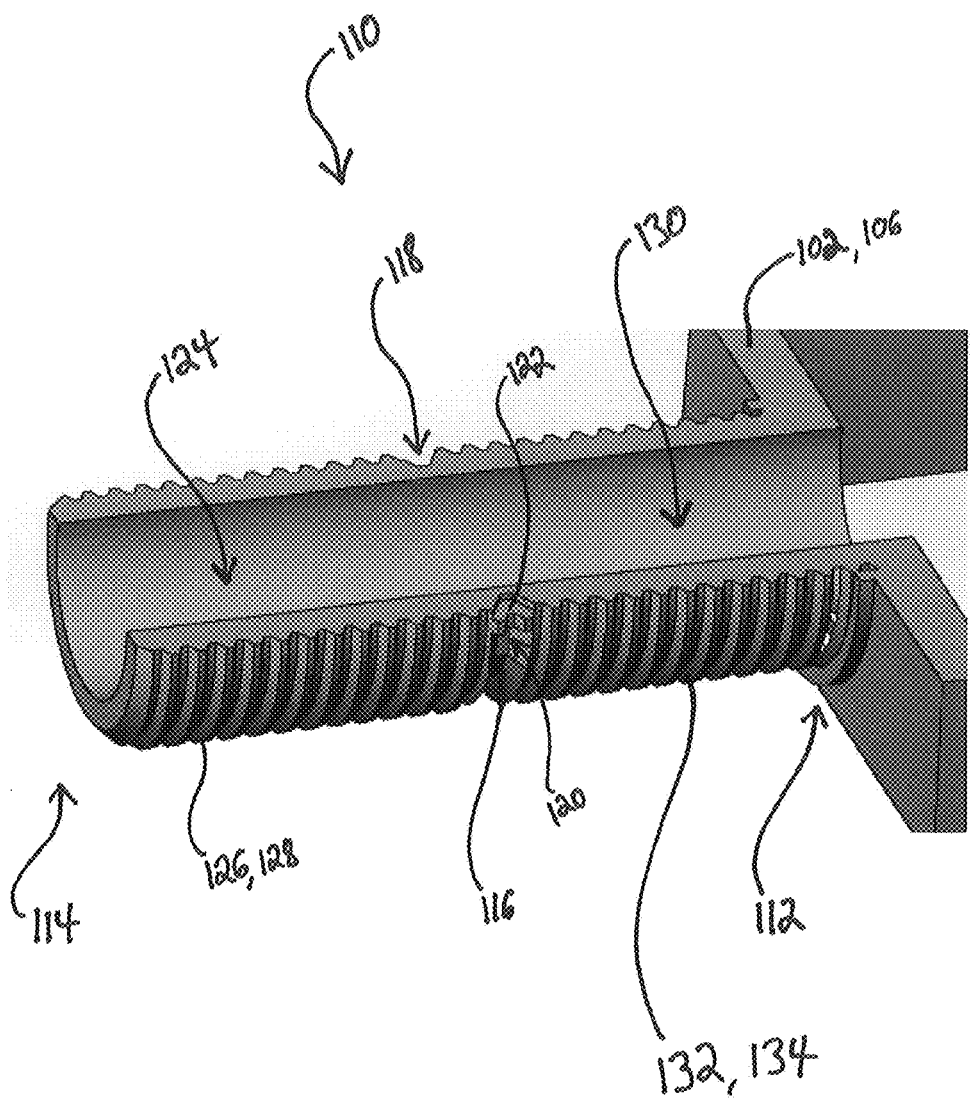
FIG. 4 is a detailed cross-sectional perspective view of the mount of the adaptable sensor assembly of FIG. 2.
Figure 5:
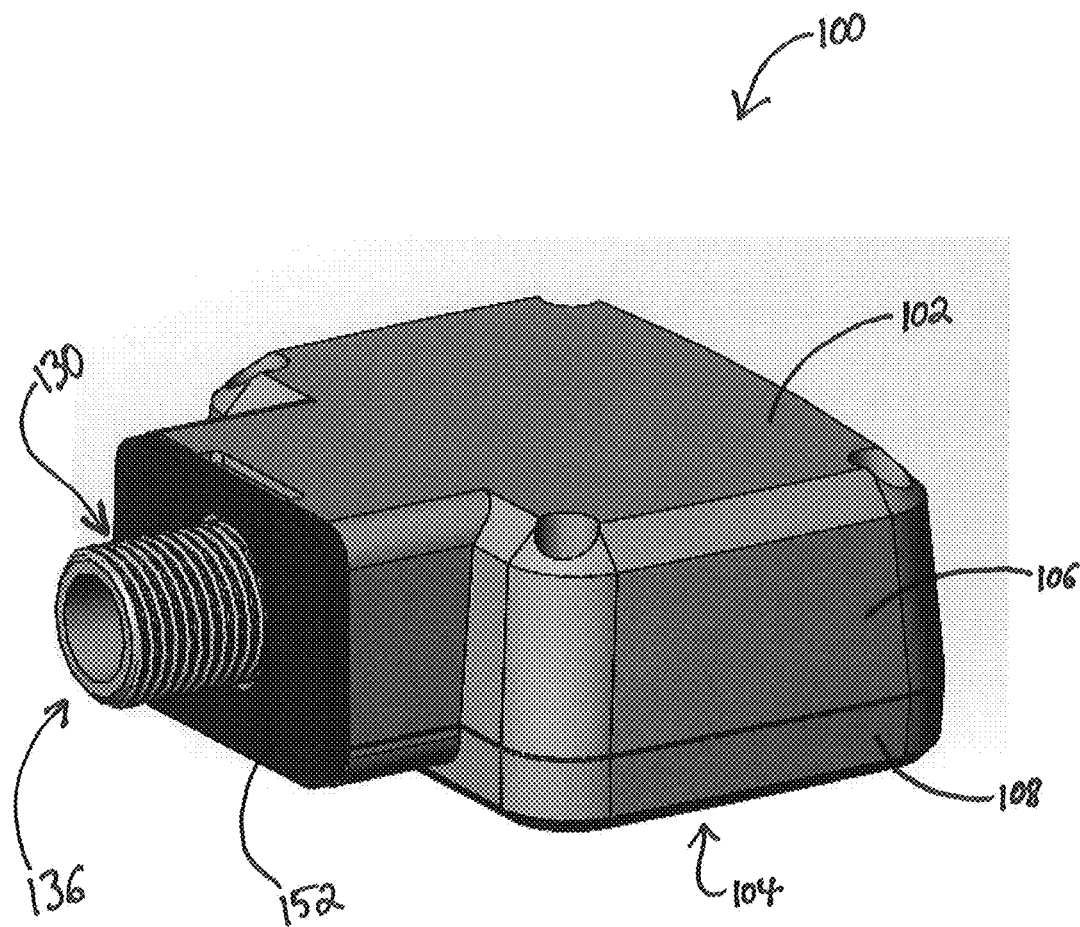
FIG. 5 is a perspective view of the adaptable sensor assembly of FIG. 2 without the spacer, with the gasket positioned against the sensor housing, and with a portion of the mount removed.
Figure 6:
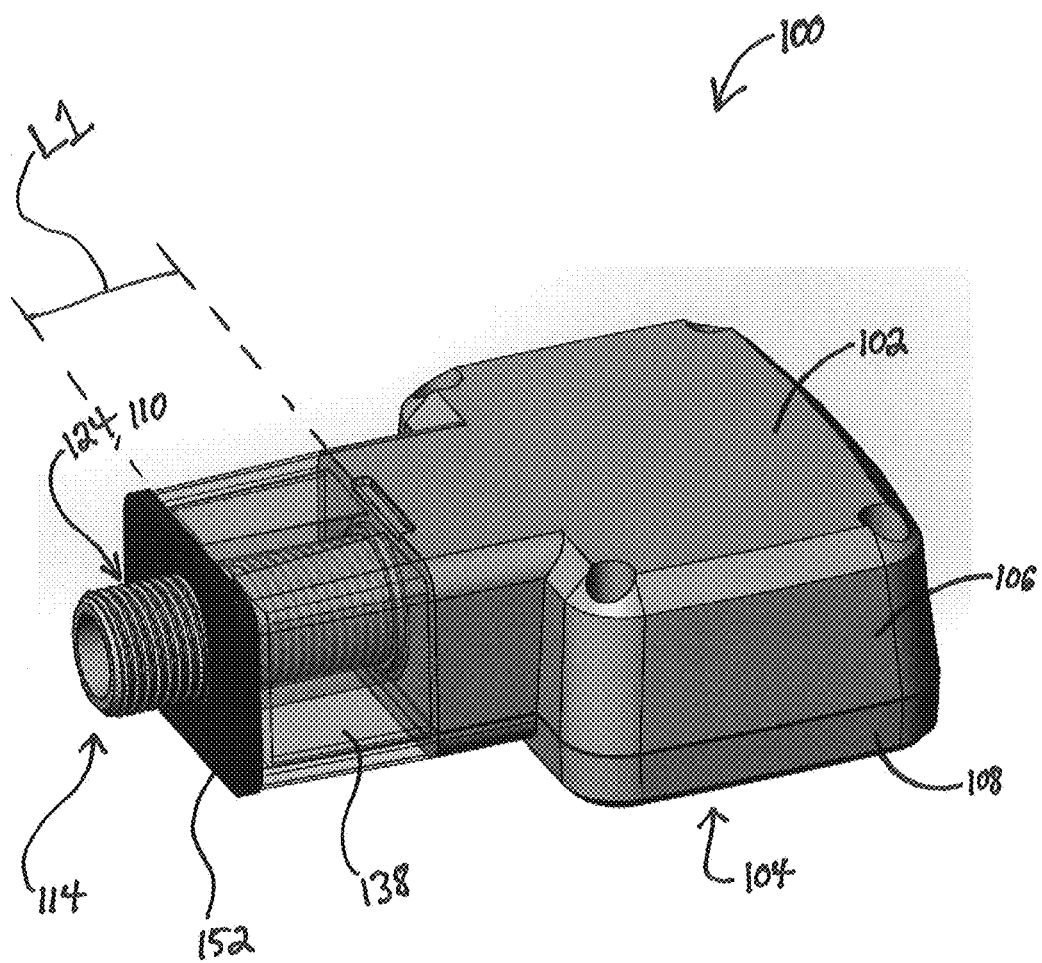
FIG. 6 is a perspective view of the adaptable sensor assembly of FIG. 2.
Figure 8:
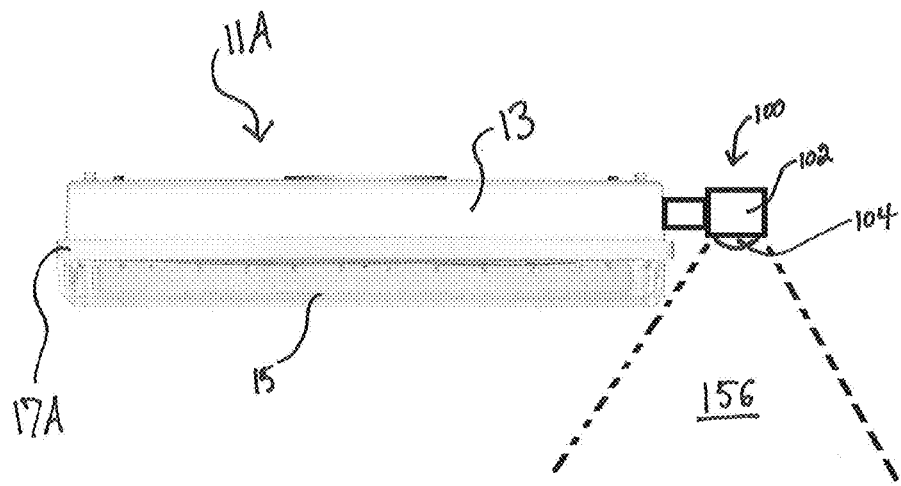
FIG. 8 is a side elevation view of a light fixture having a short gasket lip with the adaptable sensor assembly as shown in FIG. 5 mounted thereon.
Figure 9:
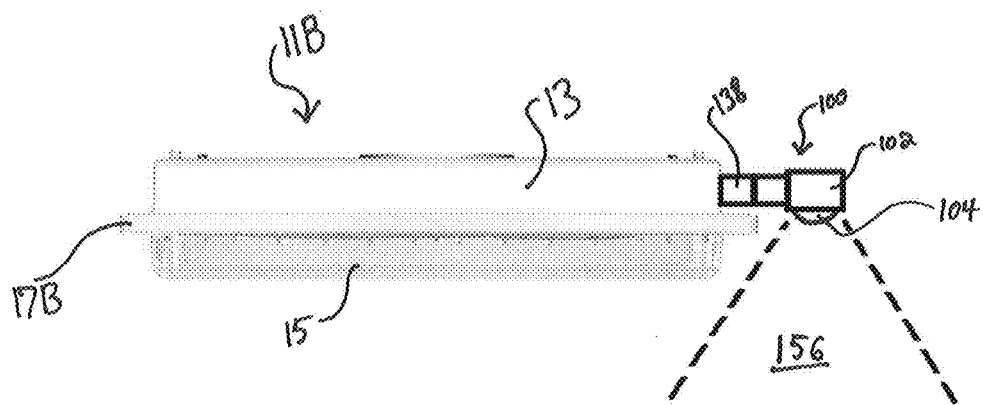
FIG. 9 is a side elevation view of a light fixture having a long gasket lip with the adaptable sensor assembly as shown in FIG. 6 mounted thereon.

Unless specifically stated otherwise, any part of the apparatus of the present invention may be made of any appropriate or suitable material including, but not limited to, metal, alloy, polymer, polymer mixture, wood, composite, or any combination thereof. Turning now to FIG. 1, a typical light fixture 11 including a light fixture body 13 and a light fixture lens 15 is shown. The light fixture body 13 and light fixture lens 15 may be sealingly closed together with a light fixture gasket disposed between the light fixture body and light fixture lens. This connection point between the light fixture body 13 and light fixture lens 15 may form a gasket lip 17 of at least one of the light fixture body and light fixture lens. A fixture opening, or knock-out, 19 may be defined in the light fixture body 13. The light fixture body 13 may define threads for threadingly connecting an insert into the fixture opening 19. Additionally or alternatively, a seal may be fitted into the fixture opening 19. The seal may define a seal opening and threads for threadingly connecting an insert into the opening in the seal. Some embodiments of the light fixture body 13 may include a fixture opening 19 with no threads. As shown in FIG. 8, some light fixtures 11A may include a relatively short gasket lip 17A. As shown in FIG. 9, other light fixtures 11B may include a relatively long gasket lip 17B. The relatively short gasket lip 17A may protrude from the side of the light fixture body 13 less than about one inch. In one embodiment, the relatively short gasket lip 17A protrudes from the side of the light fixture body 13 about one half of an inch. The relatively long gasket lip 17B may protrude from the side of the light fixture body 13 more than about one inch. In one embodiment, the relatively long gasket lip 17B protrudes from the side of the light fixture body 13 about one and one half of an inch.

Turning to FIGS. 2-7, an adaptable sensor assembly 100 is shown. The adaptable sensor assembly 100 may be mounted to a light fixture 11 to provide the light fixture with control capabilities. The sensor assembly 100 may include a sensor housing 102. The sensor housing 102 may be of any appropriate size and shape and may be configured to house at least one sensor 104 disposed therein. The sensor housing 102 may also house other electronic components as appropriate. In one embodiment, the sensor housing 102 may include two housing portions 106, 108 that may be joined together to form the sensor housing. The housing portions 106, 108 may be joined by a fastener or any other appropriate method.

A mount 110 may extend from the sensor housing 102. The mount 110 may include a base end 112 connected to the sensor housing 102. A first engagement end 114 of the mount 110 may be opposite the base end 112. The mount 110 may be hollow in some embodiments to reduce weight and/or so wires may pass therethrough.

A break point 116 may be defined in the mount. The break point 116 may include a weak portion 118 of the mount 110 that is structurally weaker than a majority of the mount. The break point 116 may include the weak portion 118 being formed by one or more notches 120 in the mount 110, being formed by one or more slots in the mount, being formed of a different material compared to the rest of the mount, being a honeycomb instead of a solid portion of the mount, and the like. In embodiments of the mount 110 including the notches 120, connector portions 122 may be disposed between the notches to give the mount an appropriate strength to help prevent accidental breaking at the break point 116 during shipping and the like.

A first mount portion 124 of the mount 110 may be defined between the first engagement end 114 and the break point 116. The first mount portion 124 may be configured to removably connect the sensor assembly 100 to the light fixture 11 at the fixture opening 19 in the light fixture. Many embodiments of the sensor assembly 100 may include the first mount portion having a first opening engagement protrusion 126. In some embodiments, the first opening engagement protrusion 126 may include a first helical thread 128. Other embodiments of the first opening engagement protrusion 126 may include a detent mechanism, a leaf spring, a snap-in post or groove, any other connectors that allow removable connection, any combination thereof, and the like.

A second mount portion 130 of the mount 110 may be defined between the break point 116 and the base end 112. The second mount portion 130 may be configured to removably connect the sensor assembly 100 to the light fixture 11 at the fixture opening 19. The second mount portion 130 may include a second opening engagement protrusion 132. The second opening engagement protrusion 132 may include a second helical thread 134 similar to the construction of the first mount portion 124. As stated above, the second opening engagement protrusion 132 may include any appropriate construction.

The first mount portion 124 may be configured to be removed from the second mount portion 130 at the break point 116. In many embodiments, the first mount portion 124 may be configured to be removed from the second mount portion 130 by hand through snapping off the first mount portion or fatiguing the mount 110 at the break point 116. In other embodiments, the first mount portion 124 may be configured to only be removed from the second mount portion 130 through the use of a tool such as a wrench, a hammer, a blade, any combination thereof, and the like.

The second mount portion 130 may be configured to form a secondary engagement end 136 opposite the base end 112 of the mount 110 when the first mount portion has been removed from the mount. The secondary engagement end 136 may, in some embodiments, include at least some of the weak portion 118 of the mount 110 remaining on the second mount portion 130. A user may remove the remaining sections of the weak portion 118 either by hand or through the use of one or more tools. Alternatively, the user may leave the sections of the weak portion 118 attached to the second mount portion 130.

The sensor assembly 100 may also include a spacer 138. The spacer 138 may include a spacer length L1 that is longer than the second mount portion 130. The spacer 138 may be sized and/or otherwise configured to cover the weak portion 118 of the mount 110 to prevent the mount from breaking at the break point 116. The spacer 138 may further include an inner surface 140 defining a pass-through hole 142 in the spacer. The pass-through hole 142 may be sized and/or otherwise configured to accept at least a portion of the mount 110 therethrough. The spacer 138 may be configured to removably connect to at least one of the first mount portion 124, the second mount portion 130, and the sensor housing 102. In many embodiments, the spacer 138 may simply be slidably received on the mount 110 without otherwise connecting to the mount or the sensor housing 102. In one embodiment, the spacer 138 may include a spacer helical thread 144 disposed on the inner surface 140 of the spacer. The spacer helical thread 144 may be configured to threadingly engage at least one of the first helical thread 128 and the second helical thread 134. In another embodiment, the spacer 138 may removably connect to the sensor housing 102 via detents, snap-in tabs, set pins, and the like.

Figure 7:
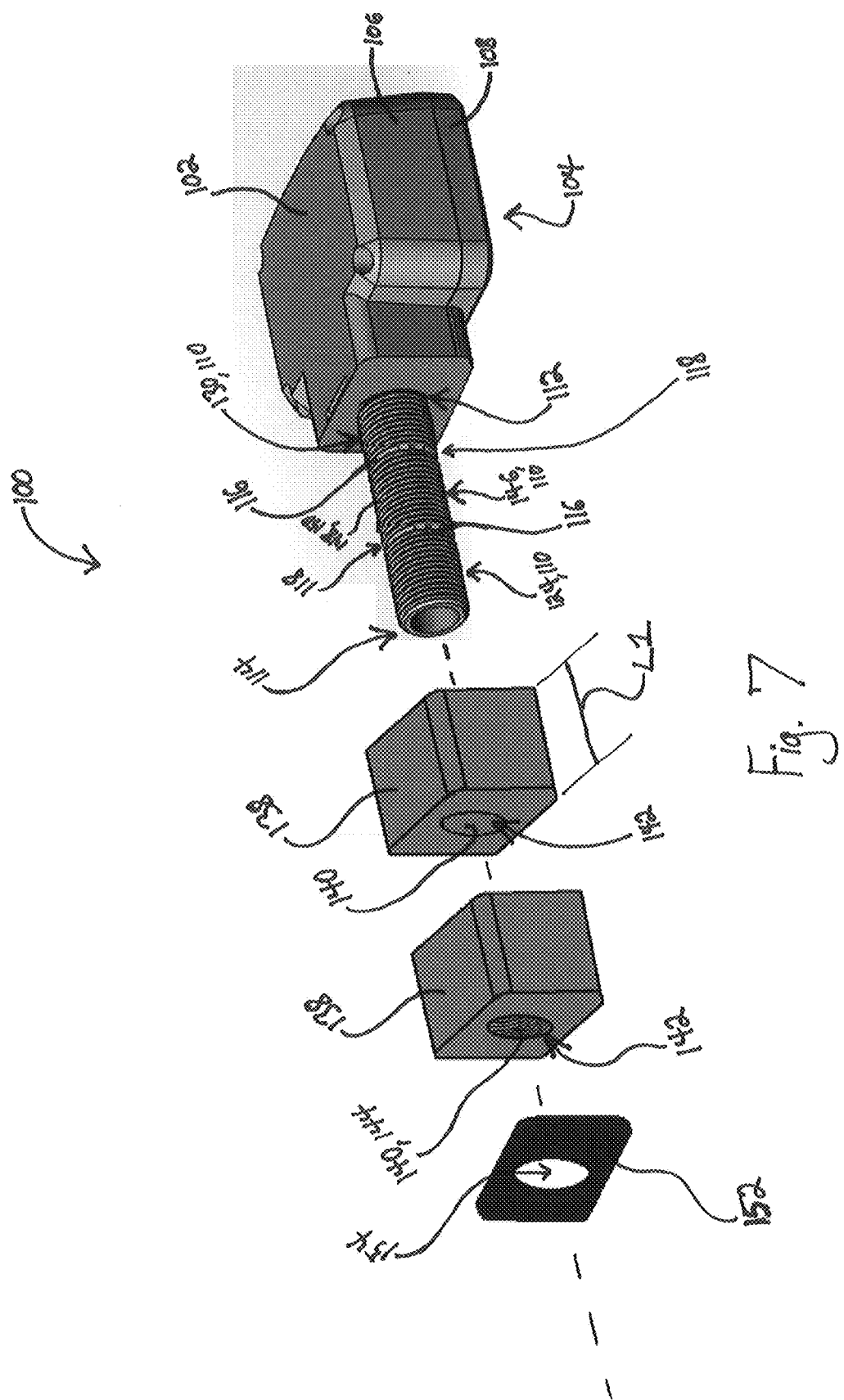
FIG. 7 is an exploded perspective view of the adaptable sensor assembly of FIG. 2 with a third mount portion and a second spacer.

Some embodiments of the sensor assembly 100, such as that shown in FIG. 7, may include any appropriate number of possible configurations. For instance, the sensor assembly 100 may further include a third mount portion 146 defined between two break points 116. The third mount portion 146 may include a third opening engagement protrusion 148 such as a third helical thread 150 or other configuration as mentioned above with regard to the first and second mount portions 124, 130. The first mount portion 124 and second mount portion 130 may be on either side of the third mount portion 146. In such an embodiment, multiple spacers 138 may be used for a light fixture 11 having a certain sized gasket lip 17 or some other obstruction. Alternatively, spacers 138 of varying sizes may be included with the sensor assembly 100 so a user may select a single spacer that is of the appropriate length for the light fixture 11 to which the sensor assembly will be attached. Embodiments with more than three mount portions are also contemplated herein.

The sensor assembly 100, in at least one embodiment, includes at least one gasket 152. The gasket 152 may be an O-ring or some other seal member and may include a gasket hole 154. The gasket 152 may be disposed with the mount 110 occupying the gasket hole 154. The gasket 152 may also be configured to form a seal between a spacer 138 and the light fixture 11, the sensor housing 102 and the light fixture, the sensor housing and a spacer, and/or between two spacers.

The present invention also relates to a method of mounting a sensor assembly 100 on a corresponding light fixture 11 having a fixture opening 19 defined therein. A user may observe the light fixture 11, particularly the gasket lip 17 and/or any other possible obstructions that may prevent the sensor 104 from assessing the full sensing area 156 unobstructed. If the user observes that the light fixture 11 has a gasket lip 17A (relatively short gasket lip) that would not extend into a sensing area 156 of the sensor assembly 100, even if the sensor assembly were mounted onto the light fixture without using a spacer 138, the user may break a first mount portion 124 away from a second mount portion 130 at a break point 116 of the mount 110. The break point 116 may be defined between the first mount portion 124 and the second mount portion 130. The user may then removably connect the sensor assembly 100 to the light fixture 11 by inserting the second mount portion 130 into the fixture opening 19. The second mount portion 130 may be threaded into the fixture opening 19 in some embodiments. The user may additionally place a gasket 152 between the sensor housing 102 and the light fixture 11.

If the user observes that the light fixture 11 has a gasket lip 17B (relatively long gasket lip) that would extend into the sensing area 156 of the sensor assembly 100 if the sensor assembly were mounted onto the light fixture without using a spacer 138, the user may place the spacer that is longer than the second mount portion 130 onto the sensor assembly such that at least some of the first mount portion 124 extends beyond the spacer. The user may then removably connect the sensor assembly 100 to the light fixture 11 by inserting the first mount portion 124 into the fixture opening 19. The first mount portion 124 may be threaded into the fixture opening 19 in some embodiments. The user may additionally place a gasket 152 between the spacer 138 and the light fixture 11, between the spacer and sensor housing 102, or both.

Alternative embodiments include removably connecting the spacer 138 to at least one of the first mount portion 124, the second mount portion 130, and the sensor housing 102. In one embodiment, the spacer 138 may be threaded onto at least one of the first mount portion 124 and the second mount portion 130. Other forms of removable connection, however, are also contemplated herein.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the invention have been described using specific terms, such description is for illustrative purposes only. The words used are words of description rather than limitation. It is to be understood that changes and variations may be made by those of ordinary skill in the art without departing from the spirit or the scope of the present invention, which is set forth in the following claims. In addition, it should be understood that aspects of the various embodiments may be interchanged in whole or in part. While specific uses for the subject matter of the invention have been exemplified, other uses are contemplated. Therefore, the spirit and scope of the appended claims should not be limited to the description of the versions contained herein.

Thus, although there have been described particular embodiments of the present invention of a new and useful "Adaptable Fixture Mount Sensor for Vapor Tight Light Fixtures", it is not intended that such references be construed as limitations upon the scope of this invention except as set forth in the following claims.

What is claimed is:

1. A method of mounting a sensor assembly on a corresponding light fixture having a fixture opening defined therein, the method comprising:
   for a first light fixture having a gasket lip extending adjacent to a sensing area of the sensor assembly when the sensor assembly is mounted on the first light fixture without a spacer:
   (a) detaching a first mount portion from a second mount portion collinear with the first mount portion at a break point defined between the first mount portion and the second mount portion; and
   (b) removably connecting the sensor assembly to the light fixture by inserting the second mount portion into the fixture opening; and
   for a second light fixture having a gasket lip extending into the sensing area of the sensor assembly when the sensor assembly is mounted on the second light fixture without the spacer:
   (c) placing the spacer that is longer than the second mount portion onto the sensor assembly such that at least some of the first mount portion extends beyond the spacer; and
   (d) removably connecting the sensor assembly to the light fixture by inserting the first mount portion into the fixture opening.

2. The method of claim 1, wherein the break point is structurally weaker than the first mount portion and the second mount portion.

3. The method of claim 1, wherein:
   step (b) further includes threading the second mount portion into a fixture opening of the first light fixture; and step (d) further includes threading the first mount portion into a fixture opening of the second light fixture.

4. The method of claim 3, wherein step (c) further includes threading the spacer onto at least one of the first mount portion or the second mount portion.

5. The method of claim 1, further comprising:
for the first light fixture having the gasket lip that extends adjacent to the sensing area of the sensor assembly when the sensor assembly is mounted on the first light fixture without the spacer, placing a gasket between a sensor housing of the sensor assembly and the first light fixture; and
for the second light fixture having the gasket lip that extends into the sensing area of the sensor assembly when the sensor assembly is mounted on the second light fixture without the spacer, placing the gasket between the spacer and the second light fixture.

6. The method of claim 1, wherein step (c) includes removably connecting the spacer to at least one of the first mount portion, the second mount portion, or a sensor housing of the sensor assembly.

* * * * *